US009862856B2

(12) United States Patent
Yang et al.

(10) Patent No.: US 9,862,856 B2
(45) Date of Patent: Jan. 9, 2018

(54) WOOD COATING COMPOSITION

(71) Applicants: Rohm and Haas Company, Philadelphia, PA (US); Dow Global Technologies LLC, Midland, MI (US)

(72) Inventors: Xiaohong Yang, Shanghai (CN); Jianming Xu, Shanghai (CN); Yawei Xu, Shanghai (CN); Baoqing Zheng, Shanghai (CN); Shujun Shu, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/891,044

(22) PCT Filed: May 30, 2013

(86) PCT No.: PCT/CN2013/076448
§ 371 (c)(1),
(2) Date: Nov. 13, 2015

(87) PCT Pub. No.: WO2014/190515
PCT Pub. Date: Dec. 4, 2014

(65) Prior Publication Data
US 2016/0122575 A1 May 5, 2016

(51) Int. Cl.
| | | |
|---|---|---|
| *C08G 77/14* | (2006.01) | |
| *C08G 77/20* | (2006.01) | |
| *C08F 20/18* | (2006.01) | |
| *C08F 220/54* | (2006.01) | |
| *C09D 133/14* | (2006.01) | |
| *C08F 265/06* | (2006.01) | |
| *C08F 220/14* | (2006.01) | |
| *C09J 133/12* | (2006.01) | |
| *C09D 4/06* | (2006.01) | |
| *C08F 230/08* | (2006.01) | |

(52) U.S. Cl.
CPC .......... *C09D 133/14* (2013.01); *C08F 220/14* (2013.01); *C08F 265/06* (2013.01); *C09D 4/06* (2013.01); *C09J 133/12* (2013.01); *C08F 2230/085* (2013.01); *C08G 77/20* (2013.01)

(58) Field of Classification Search
CPC ................. C08F 2230/085; C08F 220/06; C08F 220/14; C08F 220/18; C08F 220/20; C08F 220/58; C09D 4/06; C08G 77/20
See application file for complete search history.

(56) References Cited

U.S. PATENT DOCUMENTS

2002/0120039 A1* 8/2002 Furukawa ............. C08F 230/08 524/81
2010/0041822 A1 2/2010 Hashemzadeh
2012/0264859 A1* 10/2012 Xu .......................... C08L 31/02 524/243

FOREIGN PATENT DOCUMENTS

| CN | 1385447 A | 12/2002 |
|---|---|---|
| CN | 1438253 A | 8/2003 |
| DE | 102007021776 A1 | 11/2008 |
| EP | 1305377 A1 | 5/2003 |
| EP | 2514790 A1 | 10/2012 |
| JP | 1996100035 A | 4/1996 |
| JP | 2002121467 A | 4/2002 |
| WO | 2011133408 A2 | 10/2011 |

OTHER PUBLICATIONS

International Search Report for International Application No. PCT/CN2013/076448; International Filing Date May 30, 2013; dated Feb. 20, 2014; 3 pages.
Written Opinion of the International Search Report for International Application No. PCT/CN2013/076448; International Filing Date May 30, 2013; dated Feb. 20, 2014; 4 pages.

* cited by examiner

*Primary Examiner* — Karuna P Reddy
(74) *Attorney, Agent, or Firm* — Karl E. Stauss; Cantor Colburn LLP

(57) ABSTRACT

A wood coating formulation with improved water repellency while maintaining coating performance such as clarity and hardness, the process of making thereof.

10 Claims, No Drawings

WOOD COATING COMPOSITION

FIELD OF THE INVENTION

This invention relates to a coating composition or formulation, especially, a wood coating formulation with improved water repellency while maintaining coating performance such as clarity and hardness.

INTRODUCTION

In coatings, especially wood coatings, water repellency has a significant impact on coating performance such as water resistance and alcohol resistance. Water repellency of wood coatings could be obtained by incorporating hydrophobic monomers into polymer binder by polymerization. Commonly used hydrophobic monomers include (meth)acrylate $C_6$-$C_{22}$ alkyl ester monomers such as 2-ethylhexyl acrylate (2-EHA), lauryl methyacrylate, and linear silicone with at least one double bond such as Dow Corning™ 32 additive commercially available from Dow Corning.

Both (meth)acrylate $C_6$-$C_{22}$ alkyl ester monomers and linear silicone with at least one double bond polymerize with other commonly used monomers to form a coating with excellent water repellency with different hydrophobicity.

In addition to water repellency, wood coating films also have to be hard and clear. Therefore, it is desirable to provide a coating, especially a wood coating, with good water repellency while maintaining good coating performance such as hardness and clarity.

SUMMARY OF THE INVENTION

The present invention provides a polymer dispersion comprising, based on the total weight of the polymer dispersion, from 40 wt. % to 70 wt. % of water, and from 30 wt. % to 60 wt. % of polymer particles comprising, as polymerized units, based on the total weight of the polymer particles, i) from 28 wt. % to 46 wt. % of at least one (meth)acrylate $C_6$-$C_{22}$ alkyl ester nonionic monomer; ii) from 0.1 wt. % to 10 wt. % of at least one self-crosslinking monomer; iii) from 2 wt. % to 4 wt. % of at least one reactive silicone with at least one carbon-carbon double bond; iv) from 0.5 wt. % to 5 wt. % of a reactive surfactant.

The reactive silicone with at least one double bond and the (meth)acrylate $C_6$-$C_{22}$ alkyl ester nonionic monomer are polymerized through the carbon-carbon double bond; the polymer particles have a Tg of from 20° C. to 50° C.; and a particle size of from 50 to 150 nm.

The reactive silicone has one of the following formulas (I) to (III):

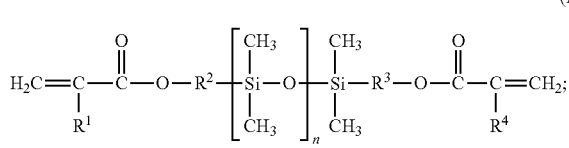

in formula (I), $R^1$ or $R^4$ is the same or different, and represents a hydrogen atom or a methyl group; $R^2$ or $R^3$ is the same or different, and represents a $C_1$-$C_6$ bivalent hydrocarbon group; and n represents an integer of from 1 to 100;

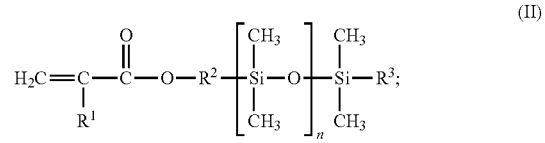

in formula (II), $R^1$ represents a hydrogen atom or a methyl group; $R^2$ represents a $C_1$-$C_6$ bivalent hydrocarbon group; $R^3$ represents a $C_1$-$C_{10}$ alkyl group or a $C_1$-$C_{10}$ alkoxyl group; and n represents an integer of from 1 to 100; or

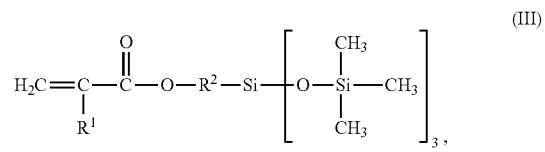

in formula (III), $R^1$ represents a hydrogen atom or a methyl group, and $R^2$ represents a $C_1$-$C_6$ bivalent hydrocarbon group.

The reactive surfactant has a structure of $R^1$-$R^2$; and $R^1$ is an alkenyl group selected from $CH_3$—CH=CH—, $CH_2$=CH—HC—, $CH_2$=C($CH_3$)—$CH_2$—$CH_2$—; and $R^2$ is a radical comprising at least two carbon atoms and at least one oxylene, oxypropylene or oxybutylene unit. In a preferred embodiment, the (meth)acrylate $C_6$-$C_{22}$ alkyl ester nonionic monomer is selected from 2-ethylhexyl (meth)acrylate, decyl (meth)acrylate, lauryl (meth)acrylate, isodecyl (meth)acrylate, and the combination thereof.

In another preferred embodiment, the self-crosslinking monomer is selected from diacetone acrylamide, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth) acrylate, and the composition thereof.

In another preferred embodiment, the reactive surfactant has a structure of $R^1$-$R^2$; and $R^2$ is —$C_6H_3(R^3)$—O—$(CH_2$—$CH_2$—O$)_n$—$R^4$, —O—$CH_2$—CH($CH_2$—O—$C_6H_4$—$R^3$)—O—$(CH_2$—$CH_2$—O$)_n$—$R^4$, —O—$(CH_2$—$CH_2$—O$)_n$—$R^4$, —O—$(CH_2$—CH($CH_3$)—O$)_n$—$R^4$, —O—$(CH_2$—CH($CH_2CH_3$)—O$)_n$—$R^4$, —O—$(CH_2$—$CH_2$—O$)_m$—$(CH_2$—CH($CH_3$)—O$)_n$—$R^4$, —O—$(CH_2$—CH($CH_3$)—O$)_m$—$(CH_2$—$CH_2$—O$)_n$—$R^4$, —O—$(CH_2$—CH($CH_2CH_3$)—O$)_m$—$(CH_2$—$CH_2$—O$)_n$—$R^4$, or —O—$(CH_2$—$CH_2$—O$)_m$—$(CH_2$—CH($CH_2CH_3$)—O$)_n$—$R^4$; and $R^3$ is an alkyl group; $R^4$ is hydrogen or a polar group such as sulfonate (—$SO_3M$), sulfate (—$SO_4M$), phosphonate (—$PO_3M$) or phosphate (—$PO_4M$); M is $H^+$, $Li^+$, $Na^+$, $K^+$, $NH_4^+$; and n is from 5 to 100 and m is from 0 to 100.

The present invention further provides a wood coating composition comprising from 50 wt. % to 85 wt. % based on the total weight of the wood coating composition of the polymer dispersion as described above.

DETAILED DESCRIPTION OF THE INVENTION

The polymer dispersion of the present invention comprises, based on the total weight of the polymer dispersion, from 40 wt. % to 70 wt. %, preferably from 50 wt. % to 60 wt. % of water, and from 30 wt. % to 60 wt. %, preferably from 40 wt. % to 50 wt. % of polymer particles.

The polymer particles comprise, as a polymerized unit, from 28 wt. % to 46 wt. %, preferably from 30 wt. % to 40 wt. %, and more preferably from 31 wt. % to 37 wt. %, based on the total weight of the polymer particles, at least one (meth)acrylate $C_6$-$C_{22}$ alkyl ester nonionic monomer. A "nonionic monomer" means that the polymerized monomer residue does not bear an ionic charge between pH=1-14. Suitable (meth)acrylate $C_6$-$C_{22}$ alkyl ester nonionic monomers include (meth)acrylic esters such as 2-ethylhexyl (meth)acrylate, cyclohexyl (meth)acrylate, tetradecyl (meth)acrylate, oleyl (meth)acrylate, palmityl (meth)acrylate, stearyl (meth)acrylate, decyl (meth)acrylate, lauryl (meth)acrylate, and isodecyl (meth)acrylate; succinates such as dihexyl succinate and didecyl succinate; vinyl esters such as vinyl versatate. Preferably, the (meth)acrylate $C_6$-$C_{22}$ alkyl ester nonionic monomer is selected from 2-ethylhexyl (meth)acrylate, decyl (meth)acrylate, lauryl (meth)acrylate, isodecyl (meth)acrylate, and the combination thereof. More preferably, the (meth)acrylate $C_6$-$C_{22}$ alkyl ester nonionic monomer is selected from 2-ethylhexyl (meth)acrylate, lauryl (meth)acrylate, and the combination thereof.

The polymer particles of the present invention further comprise, as a polymerized unit, from 2 wt. % to 4 wt. %, preferably from 2.1 wt. % to 3.9 wt. %, and more preferably from 2.5 wt. % to 3.5 wt. % based on the total weight of the polymer particles, at least one reactive silicone with at least one carbon-carbon double bond. The reactive silicone with at least one carbon-carbon double bond may have one of the following formulas.

Reactive silicone with at least one carbon-carbon double bond may have a structure of Formula (I):

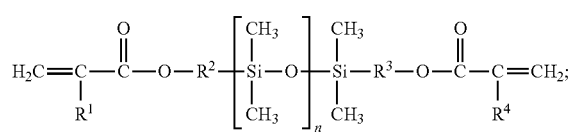

(I)

in formula (I), $R^1$ or $R^4$ is the same or different, and represents a hydrogen atom or a methyl group; $R^2$ or $R^3$ is the same or different, and represents a $C_1$-$C_6$ bivalent hydrocarbon group; and n represents an integer of from 1 to 100.

Reactive silicone with at least one carbon-carbon double bond may have a structure of Formula (II):

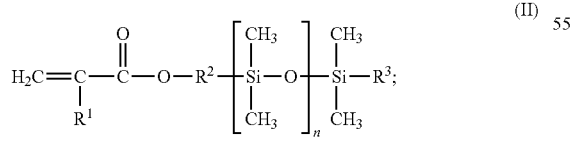

(II)

in formula (II), $R^1$ represents a hydrogen atom or a methyl group; $R^2$ represents a $C_1$-$C_6$ bivalent hydrocarbon group; $R^3$ represents a $C_1$-$C_{10}$ alkyl group or a $C_1$-$C_{10}$ alkoxyl group; and n represents an integer of from 1 to 100.

Reactive silicone with at least one carbon-carbon double bond may have a structure of Formula (III):

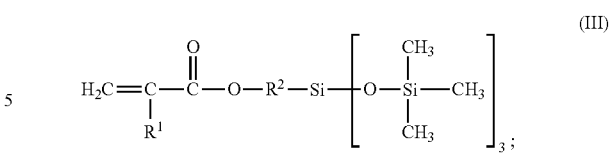

(III)

in formula (III), $R^1$ represents a hydrogen atom or a methyl group, and $R^2$ represents a $C_1$-$C_6$ bivalent hydrocarbon group.

Illustrative examples of the reactive silicone with at least one carbon-carbon double bond include, Dow Corning 32 additive commercially available from Dow Corning, CoatOSil™ 3509 commercially available from Momentive.

The polymer particles of the present invention further comprise, as a polymerized unit, from 0.1 wt. % to 10 wt. %, preferably from 1 wt. % to 5 wt. %, and more preferably from 1.5 wt. % to 3 wt. %, at least one self-crosslinking monomer. The "self-crosslinking monomer" refers to monomers containing acetoacetoxy groups, acetoacetamide groups, N-hydroxylmethyl groups or diacetone acrylamide functional groups. Suitable self-crosslinking monomers include diacetone acrylamide (DAAm), hydroxylmethyl amide monomers such as N-hydroxylmethyl (meth) acrylamide; acetoacetoxy or acetoacetamide functional monomers such as acetoacetoxyethyl (meth)acrylate, acetoacetoxypropyl (meth)acrylate, acetoacetoxybutyl (meth)acrylate, and 2,3-di(acetoacetoxy) propyl (meth)acrylate; allyl acetoacetates; vinyl acetoacetates; and acetoacetamides of formula (IV):

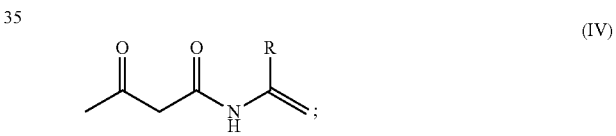

(IV)

wherein R is either H or methyl. Preferred self-crosslinking monomers are selected from diacetone acrylamide (DAAm), acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth) acrylate, and the composition thereof.

The polymer particles of the present invention further comprise, as a polymerized unit, from 0.5 wt. % to 5 wt. %, preferably from 1 wt. % to 3 wt. % based on the total weight of the polymer particles, a reactive surfactant.

The reactive surfactant used in the present invention has a structure of:

wherein $R^1$ is an alkenyl group selected from $CH_3$—CH=CH—, $CH_2$=CH—HC—, $CH_2$=C($CH_3$)—$CH_2$—$CH_2$—; $R^2$ is a radical comprising at least two carbon atoms and at least one oxylene or oxypropylene or oxybutylene unit. Preferably $R^2$ is —$C_6H_3(R^3)$—O—($CH_2$—$CH_2$—O)$_n$—$R^4$, —O—$CH_2$—CH($CH_2$—O—$C_6H_4$—$R^3$)—O—($CH_2$—$CH_2$—O)$_n$—$R^4$, —O—($CH_2$—$CH_2$—O)$_n$—$R^4$, —O—($CH_2$—CH($CH_3$)—O)$_n$—$R^4$, —O—($CH_2$—$CH_2$—CH($CH_2CH_3$)—O)$_n$—$R^4$, —O—($CH_2$—$CH_2$—O)$_m$—($CH_2$—CH($CH_3$)—O)$_n$—$R^4$, —O—($CH_2$—CH($CH_3$)—O)$_m$—($CH_2$—$CH_2$—O)$_n$—$R^4$, —O—($CH_2$—

CH(CH$_2$CH$_3$)—O)$_m$, —(CH$_2$—CH$_2$—O)$_n$—R$^4$, or —O—(CH$_2$—CH$_2$—O)$_m$—(CH$_2$—CH(CH$_2$CH$_3$)—O)$_n$—R$^4$; wherein R$^3$ is an alkyl group; R$^4$ is hydrogen or a polar group such as sulfonate (—SO$_3$M), sulfate (—SO$_4$M), phosphonate (—PO$_3$M) or phosphate (—PO$_4$M); M is H$^+$, Li$^+$, Na$^+$, K$^+$, NH$_4^+$; and n is from 5 to 100 and m is from 0 to 100.

Suitable reactive surfactant for use in the present invention includes NOIGEN™ RN surfactants and HITENOL™ BC surfactants commercially available from Montello, Inc., LATEMUL™ PD surfactants commercially available from KAO Corporation, ADEKA RESOAP™ SR surfactants commercially available from ADEKA Corporation.

Other ethylenically unsaturated nonionic monomers may be comprised in the polymer particles, as a polymerized unit, so that the total solids of all monomers in the polymer particles reaches 100 wt. %. These other ethylenically unsaturated nonionic monomers that may be used in this invention include (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth) acrylamide; amino-functional and ureido-functional monomers; monomers bearing acetoacetate functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride and vinylidene chloride.

The polymerization techniques used to prepare the polymer include well known technologies such as emulsion polymerization. In the emulsion polymerization process, conventional surfactants may be used such as anionic and/or nonionic emulsifiers such as alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactants used is usually 0.1% to 6% by weight, based on the weight of monomer. Either thermal or redox initiation processes may be used in the polymerization process. The reaction temperature is maintained at a temperature lower than 100° C. throughout the reaction. Preferably, the reaction temperature is between 30° C. and 95° C., and more preferably, between 50° C. and 90° C. The monomer mixture may be added neat or as an emulsion in water. The monomer mixture may be added in one or more additions or continuously, linearly or not, over the reaction period, or combinations thereof.

Conventional free radical initiators may be used in polymerization. Commonly used initiators include hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid. They were typically used at an amount of from 0.01% to 3.0% by weight, based on the weight of total monomer. Redox systems using the same initiators coupled with a suitable reductant such as sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents may also be used in the polymerization to lower the molecular weight of the emulsion polymer and/or to provide a different molecular weight distribution than would otherwise have been obtained with any free radical initiator. Suitable examples of chain transfer agents include halogen compounds such as tetrabromomethane; allyl compounds; or mercaptans such as alkyl thioglycolates, alkyl mercaptoalkanoates, and C$_4$-C$_{22}$ linear or branched alkyl mercaptans. Chain transfer agent(s) may be added in one or more additions or continuously, linearly or not, over most of or the entire reaction period or during limited portion(s) of the reaction period such as in the kettle charge and in the reduction of residual monomer stage. Chain transfer agents are typically used in the amount of 0 to 5 wt. %, based on the total weight of monomer used to form the aqueous polymer dispersion. A preferred level of chain transfer agent is from 0.01 to 0.5, more preferably from 0.02 to 0.4 and most preferably from 0.05 to 0.2 mole %, based on the total moles of monomers used to form the aqueous polymer dispersion.

In one embodiment of the present invention, the aqueous emulsion polymer may be prepared by a multistage emulsion polymerization process, in which at least two stages differing in composition are polymerized in a sequential fashion. Such a process sometimes results in the formation of at least two mutually incompatible polymer compositions, thereby resulting in the formation of at least two phases within the polymer particles. Such polymer particles are composed of two or more phases of various geometries or morphologies such as core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, for a multi-staged polymer particle the amount of the monomers shall be determined from the overall composition of the emulsion polymer without regard for the number of stages or phases therein. For example, the first stage composition primarily comprises of styrene and the second stage comprises of the composition described by this invention. Furthermore, the core of the polymer particle may be hollow (i.e., air void). The polymerization techniques used to prepare such multi-stage emulsion polymers are well known in the art, e.g., as described in U.S. Pat. Nos. 4,325,856; 4,654,397; and 4,814, 373. The glass transition temperature (Tg) of the polymer particles of the present invention is from 20° C. to 50° C., preferably from 25° C. to 40° C. Tgs used herein are those calculated by using the Fox equation (T. G. Fox, Bull. Am. Physics Soc., Volume 1, Issue No. 3, page 123(1956)). That is, for calculating the Tg of a polymer of monomers M$_1$ and M$_2$, $$\frac{1}{T_g(\text{calc.})} = \frac{w(M_1)}{T_g(M_1)} + \frac{w(M_2)}{T_g(M_2)},$$

wherein $T_g$(calc.) is the glass transition temperature calculated for the polymer, $w(M_1)$ is the weight fraction of monomer $M_1$ in the polymer, $w(M_2)$ is the weight fraction of monomer $M_2$ in the polymer, $T_g(M_1)$ is the glass transition temperature of the of $M_1$, and $T_g(M_2)$ is the glass transition temperature of the of $M_2$, all temperatures being in K. The glass transition temperatures of may be found, for example, in Polymer Handbook, edited by J. Brandrup and E. H. Immergut, Interscience Publishers.

The average particle diameter of the polymer particles of the present invention is from 50 to 150 nanometers, and is preferably from 70 to 110 nanometers, as measured by a BI-90 Particle Sizer (Brookhaven Instruments, USA).

The aqueous polymer dispersion may also contain one or more organic and/or inorganic bases as a neutralizer. Suitable bases include ammonia, sodium hydroxide, potassium hydroxide, zinc oxide, mono-ethanolamine, triethyl amine, diethyl amine, dimethyl amine, sodium borate, potassium borate, aluminum hydroxide and the composition thereof.

The wood coating composition of the present invention comprises from 50 to 85%, preferably from 60% to 80%, by wet weight based on the total weight of wood coating composition, of the above mentioned polymer dispersion. The wood coating composition of the present invention may further contain at least one conventional coating adjuvant, including coalescing agents, cosolvents, surfactants, buffers, neutralizers, thickeners, non-thickening rheology modifiers, dispersants, humectants, wetting agents, biocides, plasticizers, antifoaming agents, defoaming agents, anti-skinning agents, colorants, flowing agents, crosslinkers, anti-oxidants.

Thickeners may include polyvinyl alcohol (PVA), hydrophobically modified alkali soluble emulsions (HASE), alkali-soluble or alkali swellable emulsions (ASE), hydrophobically modified ethylene oxide-urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose. Also useful as thickeners are fumed silica, attapulgite clay and other types of clay, and titanate chelating agents.

Dispersants may include non-ionic, anionic and cationic dispersants such as polyacid, 2-amino-2-methyl-1-propanol (AMP), dimethyl amino ethanol (DMAE), potassium tripolyphosphate (KTPP), trisodium polyphosphate (TSPP), citric acid and other carboxylic acids. Prefer the polyacids with suitable molecular weight. The polyacids may include homopolymers and polymers based on polycarboxylic acids, including those that have been hydrophobically- or hydrophilically-modified. Suitable examples include polyacrylic acid or polymethacrylic acid or maleic anhydride with various monomers such as styrene, acrylate or methacrylate esters, diisobutylene, and other hydrophilic or hydrophobic comonomers as well as the salts of the aforementioned dispersants, and mixtures thereof. The molecular weight of such polyacids dispersant is from 400 to 50,000, or from 400 to 30,000, preferably from 500 to 10,000, more preferably from 1,000 to 5,000 and most preferably from 1,500 to 3,000.

Antifoaming agents and/or defoaming agents may include silicone-based and mineral oil-based defoamers. Surfactants may include anionic, nonionic, cationic surfactants and amphiphilic surfactant. Preferably, the surfactant is anionic and nonionic surfactants, and more preferably, the surfactant is nonionic surfactant.

Suitable coalescing agents, plasticizers, and other optional cosolvents may include ethylene glycol, propylene glycol, hexylene glycol, 2,2,4-trimethyl-1,3-pentanediol monoisobutyrate (TEXANOL™), Coasol™, glycol ethers, mineral spirits, methyl carbitol, butylcarbitol, phthalates, and adipates.

The formulation of the wood coating compositions involve the selection and admixture of appropriate coating ingredients in correct proportions to provide a paint with specific processing and handling properties and ultimately a final dry paint film with desired properties.

The wood coating composition may be applied by conventional application methods such as brushing and spraying methods such as air-atomized spray, air-assisted spray, airless spray, high volume low pressure spray, and air-assisted airless spray.

EXAMPLES

I. Raw Materials

TABLE 1

A)

| Abbreviation | Chemical | Supplier |
|---|---|---|
| 2-EHA | 2-ethylhexyl acrylate | Sinopharm Chemical Reagent Co., Ltd. |
| MAA | methacrylic acid | Sinopharm Chemical Reagent Co., Ltd. |
| MMA | methyl methacrylate | Sinopharm Chemical Reagent Co., Ltd. |
| BA | butyl acrylate | Sinopharm Chemical Reagent Co., Ltd. |
| DAAm | diacetone acrylamide | Kyowa Hakko Chemical Co., Ltd. |
| ADH | adipic dihydrazide | Kyowa Hakko Chemical Co., Ltd. |
| APS | ammonia persulfate | Sinopharm Chemical Reagent Co., Ltd. |

B)

| Material | Supplier |
|---|---|
| DOWANOL™ PnB coalescent | Dow Chemical Company |
| DOWANOL™ DPnB coalescent | Dow Chemical Company |
| TEGO™ Airex 902w defoamer | Evonik Industries AG |
| Byk™ 346 wetting agent | Byk-Chemie GmbH |
| Deutron MK matting agent | Deuteron GmbH |
| TEGO™ Glide 410 wetting agent | Evonik Industries AG |
| ACRYSOL™ RM-8W rheology modifier | Dow Chemical Company |
| Dow Corning™ 32 additive | Dow Corning Corporation |
| Latemul PD-104 surfactant | Kao Corporation |
| sodium carbonate | Sinopharm Chemical Reagent Co., Ltd. |
| ammonia (30%) | Sinopharm Chemical Reagent Co., Ltd. |

II. Procedures

A. Preparation for Inventive Polymer (IC) and Comparative Polymer (CC)

i) Two Stage Polymerization

Monomer Emulsion 1—Latemul PD-104 surfactant (18 g, 20% active) was dissolved in deionized water (130 g), with stirring. Monomer Emulsion 1 was prepared by adding the following monomers slowly to the agitated solution: 2-EHA, MMA, and MAA. The amounts of each monomer loading are listed in Table 2.

Monomer Emulsion 2—Latemul PD-104 surfactant (36 g, 20% active) was dissolved in deionized water (128 g), with stirring. Monomer Emulsion 2 was prepared by adding the following monomers slowly to the agitated solution: 2-EHA, MMA, BA, DAAm, Dow Corning™ 32 Additive (DC-32), and MAA. The amounts of each monomer loading are listed in Table 2.

A solution containing Latemul PD-104 surfactant (20% active, 8.8 g for CC4, while 22 g for others) and deionized water (548 g) was placed in a 5 liter 4-neck round-bottom flask equipped with a thermocouple, a cooling condenser and an agitator, and was heated to 85° C. under nitrogen. An aqueous sodium carbonate solution (1.4 g sodium carbonate in 38 g deionized water), an aqueous ammonia persulfate (APS) initiator solution (1.4 g APS in 15 g deionized water), and 4.7% of Monomer Emulsion 1 were added to the flask. In about 5 minutes, initiation of polymerization was confirmed by the increase of temperature by 3° C. and a change of the external appearance of the reaction mixture. After heat generation had ended, the remainder of the Monomer Emulsion 1 was added gradually to the flask over 90 minutes, with stirring. Polymerization reaction temperature was maintained at 79 to 81° C. After the addition was completed, the vessel containing the Monomer Emulsion 1 and the feeding pipes leading into the flask were rinsed with 30 g deionized water, and the rinse was added back to the flask.

Monomer Emulsion 2 was then added in the same manner as Monomer Emulsion 1 over 90 minutes. Upon completing the addition, the reaction mixture was held at 70° C. for 60 minutes. The reaction was cooled to 50° C. and then neutralized to pH 7.0-8.0 by ammonia (30%). The reaction mixture was held at 45 to 50° C. for 10 minutes. Then the ADH slurry (18 g in 33 g water in inventive polymer, and 36 g ADH in 66 g water in comparative polymer) was post added into the reactor over 10 minutes and held for 10 minutes. The reaction was cooled to room temperature to get a final polymer emulsion.

ii) One Stage Polymerization

Monomer Emulsion 3—Latemul PD-104 surfactant (54 g, 20% active) was dissolved in deionized water (260 g), with stirring. Monomer emulsion 3 was prepared by adding the following monomers slowly to the agitated solution: DAAm, DC-32, 2-EHA, MMA, and MAA. The amounts of each monomer loading are listed in Table 3.

A solution containing Latemul PD-104 surfactant (22 g, 20% active) and deionized water (548 g) was placed in a 5-liter 4-necked round-bottom flask equipped with a thermocouple, a cooling condenser and an agitator, and was heated to 85° C. under nitrogen. An aqueous sodium carbonate solution (1.4 g sodium carbonate in 38 g deionized water), an aqueous ammonia persulfate (APS) initiator solution (1.4 g APS in 15 g deionized water), and 4.7% of Monomer Emulsion 3 were added to the flask. In about 5 minutes, initiation of polymerization was confirmed by the increase of temperature by 3° C. and a change of the external appearance of the reaction mixture. After heat generation had ended, the remainder of the Monomer Emulsion 3 was added gradually to the flask over 90 minutes, with stirring. Polymerization reaction temperature was maintained at 79 to 81° C. After completing the addition, the vessel that contained Monomer Emulsion 3 and feeding pipes leading into the flask were rinsed with 30 g deionized water, and the rinse was added back to the flask. The reaction mixture was held at 70° C. for 60 minutes. The reaction was cooled to 50° C. and then neutralized to pH 7.0-8.0 by 30% ammonia. The reaction mixture was held at 45 to 50° C. for 10 minutes. Then the ADH slurry (18 g in 33 g water) was post added into the reactor over 10 minutes and held for 10 minutes. The reaction was cooled to room temperature to get a final polymer emulsion.

TABLE 3

Monomers loading

| | Monomer Emulsion 3 | | | | |
|---|---|---|---|---|---|
| | EHA (g) | MMA (g) | MAA (g) | DC-32 (g) | DAAm (g) |
| IC 8 | 332 | 504 | 27.3 | 18.1 | 22.6 |

B. Preparation for Wood Coating Formulation

In a plastic beaker equipped with mechanical agitation and tri-blade blade, the following components were added into the beaker in sequence (while the agitator speed is at

TABLE 2

Monomers loading

| | Monomer Emulsion 1 | | | Monomer Emulsion 2 | | | | | |
|---|---|---|---|---|---|---|---|---|---|
| Examples | EHA (g) | MMA (g) | MAA (g) | MMA (g) | MAA (g) | DAAm (g) | EHA (g) | DC-32 (g) | BA (g) |
| CC 1 | 136 | 306 | 9 | 207 | 18.3 | 22.6 | 204 | 0 | 0 |
| CC 2 | 226 | 216 | 9 | 162 | 18.3 | 44.9 | 226 | 0 | 0 |
| CC 3 | 136 | 306 | 9 | 203 | 18.3 | 22.6 | 199 | 9.1 | 0 |
| CC 4 | 136 | 306 | 9 | 185 | 18.3 | 22.6 | 118 | 18.1 | 91 |
| IC 1 | 136 | 306 | 9 | 185 | 18.3 | 22.6 | 118 | 18.1 | 91 |
| IC 2 | 136 | 306 | 9 | 189 | 18.3 | 22.6 | 154 | 18.1 | 50 |
| IC 3 | 136 | 306 | 9 | 198 | 18.3 | 22.6 | 196 | 18.1 | 0 |
| IC 4 | 136 | 306 | 9 | 194 | 18.3 | 22.6 | 191 | 27.1 | 0 |
| IC 5 | 136 | 306 | 9 | 190 | 18.3 | 22.6 | 187 | 36.1 | 0 |
| IC 6 | 136 | 306 | 9 | 131 | 18.3 | 22.6 | 245 | 36.1 | 0 |
| IC 7 | 136 | 306 | 9 | 95 | 18.3 | 22.6 | 281 | 36.1 | 0 |

300-500 rpm) in 45 min: 680 g polymer emulsion, 170 g water, 25 g DOWANOL™ PnB coalescent (PNB), 8 g DOWANOL™ DPnB coalescent (DPnB), 3.7 g TEGO™ Airex 902w defoamer (902W), 3.1 g Byk 346 wetting agent (Byk 346), 30 g Deutron MK matting agent (MK), 80 g water, 3 g TEGO™ Glide 410 wetting agent (Glide 410) and 2 g ACRYSOL™ RM-8W rheology modifier (RM-8W). After that, the components were continuously mixed for another 15 min to afford a final wood coating. The solid content of the final wood coating is 30%.

C. Test Methods:

i) Water resistance (BS EN 12720:2009; Furniture. Assessment of surface resistance to cold liquids) ("BS EN" means "British Standard European Norm" and is an industry standard.)

Panels were prepared by brush applying three coats at 80-90 g/m² over each type of wood. After the first coat, panels were left at room temperature (RT) for four hours then sanded with sand paper. After the third coat, panels were allowed to dry at ambient temperature for 4 hrs then in an oven at 50° C. for 48 hrs before running the water resistance tests. Disc type filter paper was saturated with testing water, placed on the finished panels and covered with a cap to reduce evaporation. After 24 hrs, covers were removed. Tested areas were wiped with wet facial tissues, allowed to dry at RT to observe the damage degree. Rating standard for scale 1-5, where 1 was the worst, and 5 was the best, is listed below.

1: Strong change; the structure of the surface being distinctly changed and/or discoloration, change in gloss and color, and/or the surface material being totally or partially removed, and/or the filter paper adhering to the surface;

2: Significant change; test area clearly distinguishable from adjacent surrounding area, visible in all viewing directions, e.g., discoloration, change in gloss and color, and/or structure of the surface slightly changed, e.g., swelling, fiber raising, cracking, blistering;

3: Moderate change; test area distinguishable from adjacent surrounding area, visible in several viewing directions, e.g., discoloration, change in gloss and color no change in the surface structure, e.g., swelling, fiber raising, cracking, blistering;

4: Minor change; test area distinguishable from adjacent surrounding area, only when the light source is mirrored on the test surface and is reflected towards the observer's eye, e. g., discoloration, change in gloss and color no change in the surface structure, e.g., swelling, fiber raising;

5: No change; test area indistinguishable from adjacent surrounding area.

ii) Alcohol Resistance (BS EN 12720:2009; Furniture. Assessment of Surface Resistance to Cold Liquids)

Panels were prepared by brush applying three coats at 80-90 g/m² over each type of wood. After the first coat, panels were left at RT for four hours then sanded with sand paper. After the third coat, panels were allowed to dry at ambient temperature for 4 hrs then in an oven at 50° C. for 48 hrs before running the water resistance tests. Filter discs were saturated with testing 48% alcohol, placed on the finished panels and covered with a cap to reduce evaporation. After 1 hr, covers were removed. Tested areas were wiped with wet facial tissues, allowed to dry at RT to observe the damage degree. Rating standard for scale 1-5, where 1 was the worst, and 5 was the best, is listed below.

1: Strong change; the structure of the surface being distinctly changed and/or discoloration, change in gloss and color, and/or the surface material being totally or partially removed, and/or the filter paper adhering to the surface;

2: Significant change; test area clearly distinguishable from adjacent surrounding area, visible in all viewing directions, e.g., discoloration, change in gloss and color, and/or structure of the surface slightly changed, e.g., swelling, fiber raising, cracking, blistering;

3: Moderate change; test area distinguishable from adjacent surrounding area, visible in several viewing directions, e. g., discoloration, change in gloss and color no change in the surface structure, e.g., swelling, fiber raising, cracking, blistering;

4: Minor change; test area distinguishable from adjacent surrounding area, only when the light source is mirrored on the test surface and is reflected towards the observer's eye, e. g., discoloration, change in gloss and color no change in the surface structure, e.g., swelling, fiber raising;

5: No change; test area indistinguishable from adjacent surrounding area.

iii) Clarity

Byk haze-gard dual haze meter (available from BYK-Gardner GmbH) was used to evaluate the clarity of coating films. Coating film was prepared with a drawdown applicator with a 120 um thick wet film on glass plate and oven-cured at 50° C. for 48 hours. The Byk haze-gard dual haze meter tests the panel and provides two parameters: Transmittance and Haze. The clarity of the coating film was calculated based on the following equation:

$$Clarity = Transmittance * (1 - Haze).$$

Clarity below 20 was unacceptable.

iv) Pencil Hardness (ASTM D3363-05(2011)e2 Standard Test Method for Film Hardness by Pencil Test.)

A coating film was prepared with a drawdown applicator with a 120 um thick wet film on glass plate and cured in a 50° C. oven for 48 hours. Pencil hardness was tested on the glass panel with a set of Mitsubishi calibrated wood pencils. The set of Mitsubishi calibrated wood pencils meets the following scale of hardness: 6H, 5H, 4H, 3H, 2H, H, F, HB, B, 2B, 3B, 4B, 5B, 6B, where 6H was the hardest, and 6B was the softest. Approximately 5 to 6 mm (3/16 to 1/4 inch) of wood was carefully removed from the point of the wood pencil using a draftsman-type mechanical sharpener to leave an undisturbed, unmarked, smooth cylinder of graphite core. The pencil was held at an angle of 90 degrees to the abrasive paper, rubbed the graphite core against the abrasive paper maintaining an exact angle of 90 degrees until a flat, smooth and circular cross section was obtained. The cross section was free of chips or nicks in the edge of it. The coated panel was placed on a level, firm, horizontal surface. The test was started with a Mitsubishi pencil having a highest hardness and continued down the scale of hardness until the pencil will not cut into or gouge the coating film. The pencil was held firmly by a mechanical holder at a 45 degrees angle against the coating film (pointed away from the operator) and pushed away from the operator. It was suggested that the length of the stroke was 6.5 mm (1/4 inch).

The pencil hardness of the coating film was recorded as the hardest pencil that did not cut into or gouge the coating film.

TABLE 4

Acceptable wood coating performance

| Performance | Target |
|---|---|
| Water resistance | >2 |
| Alcohol resistance | >2 |

TABLE 4-continued

Acceptable wood coating performance

| Performance | Target |
| --- | --- |
| Clarity | >20 |
| Pensile Hardness | Harder than B (including B) |

III. Results

Wood coating performance results were shown in Table 6.

TABLE 5

Wood coating performance results

| Wood coatings | Polymer | Water resistance | Alcohol resistance | Clarity | Pencil Hardness |
| --- | --- | --- | --- | --- | --- |
| Comp. 1 | CC 1 | 2 | 2 | 30 | HB |
| Comp. 2 | CC 2 | 2 | 3 | 35 | 3B |
| Comp. 3 | CC 3 | 2 | 3 | 15 | HB |
| Comp. 4 | CC4 | 2 | 2 | 16 | HB |
| Example 1 | IC 1 | 3 | 3 | 26 | HB |
| Example 2 | IC 2 | 3 | 3 | 28 | HB |
| Example 3 | IC 3 | 3 | 3 | 27 | HB |
| Example 4 | IC 4 | 3 | 3 | 25 | HB |
| Example 5 | IC 5 | 3 | 3 | 27 | B |
| Example 6 | IC 6 | 3 | 3 | 26 | B |
| Example 7 | IC 7 | 3 | 3 | 25 | B |
| Example 8 | IC 8 | 3 | 3 | 22 | HB |

Comparative example 1 (Comp. 1) showed that a coating with 37% EHA but no DC-32 had poor water/alcohol resistance (2).

Comparative example 2 showed that a coating with over loading EHA had good alcohol resistance (3) but poor water resistance (2) and poor pencil hardness (3B).

Comparative example 3 showed that a coating with insufficient DC-32 had poor clarity (15) and poor water resistance (3).

Comparative example 4 showed that a coating with bigger particle size had poor clarity (16).

Examples 1-7 showed that coatings with EHA ranging from 28% to 46% and DC-32 ranging from 2% to 4% had good and balanced water/alcohol resistance (3), clarity (over 20) and pencil hardness (B to HB).

The comparison between Examples 8 and 3 showed that such desirable coating performance can be achieved both by one-stage polymerization and two-stage polymerization.

What is claimed is:

1. A polymer dispersion comprising, based on the total weight of the polymer dispersion, from 40 wt. % to 70 wt. % of water and from 30 wt. % to 60 wt. % of polymer particles comprising, as polymerized units, based on the total weight of the polymer particles,
   i) from 28 wt. % to 46 wt. % of at least one (meth)acrylate $C_6$-$C_{22}$ alkyl ester nonionic monomer;
   ii) from 0.1 wt. % to 10 wt. % of at least one self-crosslinking monomer;
   iii) from 2 wt. % to 4 wt. % of at least one reactive silicone with at least one carbon-carbon double bond;
   iv) from 0.5 wt. % to 5 wt. % of a reactive surfactant;
   wherein the reactive silicone with at least one double bond and the (meth)acrylate $C_6$-$C_{22}$ alkyl ester nonionic monomer are polymerized through the carbon-carbon double bond; the polymer particles have a Tg of from 20° C. to 50° C.; and a particle size of from 50 to 150 nm;

wherein the reactive silicone has one of the following formulas (I) to (II):

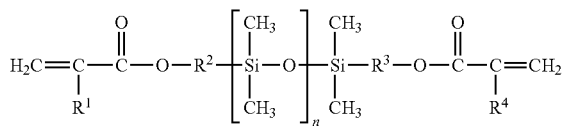

(I)

wherein $R^1$ or $R^4$ is the same or different, and represents a hydrogen atom or a methyl group; $R^2$ or $R^3$ is the same or different, and represents a $C_1$-$C_6$ bivalent hydrocarbon group; and n represents an integer of from 1 to 100;

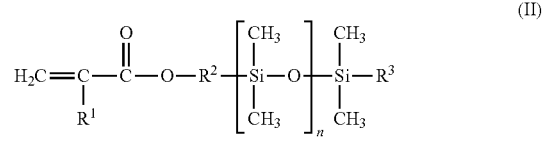

(II)

wherein $R^1$ represents a hydrogen atom or a methyl group; $R^2$ represents a $C_1$-$C_6$ bivalent hydrocarbon group; $R^3$ represents a $C_1$-$C_{10}$ alkyl group or a $C_1$-$C_{10}$ alkoxyl group; and n represents an integer of from 1 to 100;

and wherein the reactive surfactant has a structure of $R^1$-$R^2$; wherein $R^1$ is an alkenyl group selected from $CH_3$—CH=CH—, $CH_2$=CH—HC—, $CH_2$=C($CH_3$)—$CH_2$—$CH_2$—; $R^2$ is a radical comprising at least two carbon atoms and at least one oxylene, oxypropylene or oxybutylene unit.

2. The polymer dispersion according to claim 1 wherein the (meth)acrylate $C_6$-$C_{22}$ alkyl ester nonionic monomer is selected from 2-ethylhexyl (meth)acrylate, decyl (meth)acrylate, lauryl (meth)acrylate, isodecyl (meth)acrylate, and the combination thereof.

3. The polymer dispersion according to claim 2 wherein the (meth)acrylate $C_6$-$C_{22}$ alkyl ester nonionic monomer is selected from 2-ethylhexyl (meth)acrylate, lauryl (meth)acrylate, and the combination thereof.

4. The polymer dispersion according to claim 1 wherein the self-crosslinking monomer is selected from diacetone acrylamide, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth) acrylate, and the composition thereof.

5. The polymer dispersion according to claim 1 wherein the reactive surfactant has a structure of $R^1$-$R^2$; wherein $R^2$ is —$C_6H_3(R^3)$—O—$(CH_2$—$CH_2$—O$)_n$—$R_4$, —O—$CH_2$—$CH(CH_2$—O—$C_6H_4$—$R^3)$—O—$(CH_2$—$CH_2$—O$)_n$—$R_4$, —O—$(CH_2$—$CH_2$—O$)_n$—$R^4$, —O—$(CH_2$—$CH(CH_3)$—O$)_n$—$R^4$, —O—$(CH_2$—$CH(CH_2CH_3)$—O$)_n$—$R^4$, —O—$(CH_2$—$CH_2$—O$)_m$—$(CH_2$—$CH(CH_3)$—O$)_n$—$R^4$, —O—$(CH_2$—$CH(CH_3)$—O$)_m$—$(CH_2$—$CH_2$—O$)_n$—$R^4$, —O—$(CH_2$—$CH(CH_2CH_3)$—O$)_m$—$(CH_2$—$CH_2$—O$)_n$—$R^4$, or —O—$(CH_2$—$CH_2$—O$)_m$—$(CH_2$—$CH(CH_2CH_3)$—O$)_n$—$R^4$; wherein $R^3$ is an alkyl group; $R^4$ is hydrogen or a polar group; n is from 5 to 100; and m is from 0 to 100.

6. A wood coating composition comprising from 50 wt. % to 85 wt. %, based on the total weight of the wood coating composition, a polymer dispersion comprising, based on the total weight of the polymer dispersion, from 40 wt. % to 70 wt. % of water and from 30 wt. % to 60 wt. % of polymer particles comprising, as polymerized units, based on the total weight of the polymer particles,
  i) from 28 wt. % to 46 wt. % of at least one (meth)acrylate $C_6$-$C_{22}$ alkyl ester nonionic monomer;
  ii) from 0.1 wt. % to 10 wt. % of at least one self-crosslinking monomer;
  iii) from 2 wt. % to 4 wt. % of at least one reactive silicone with at least one carbon-carbon double bond;
  iv) from 0.5 wt. % to 5 wt. % of a reactive surfactant; wherein the reactive silicone with at least one double bond and the (meth)acrylate $C_6$-$C_{22}$ alkyl ester nonionic monomer are polymerized through the carbon-carbon double bond; the polymer particles have a Tg of from 20° C. to 50° C.; and a particle size of from 50 to 150 nm;
wherein the reactive silicone has one of the following formulas (I) to (III):

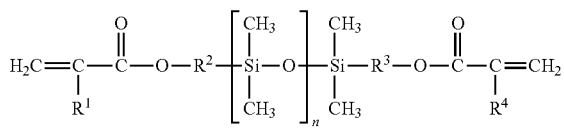
(I)

wherein $R^1$ or $R^4$ is the same or different, and represents a hydrogen atom or a methyl group; $R^2$ or $R^3$ is the same or different, and represents a $C_1$-$C_6$ bivalent hydrocarbon group; and n represents an integer of from 1 to 100;

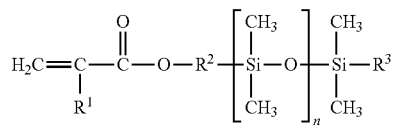
(II)

wherein $R^1$ represents a hydrogen atom or a methyl group; $R^2$ represents a $C_1$-$C_6$ bivalent hydrocarbon group; $R^3$ represents a $C_1$-$C_{10}$ alkyl group or a $C_1$-$C_{10}$ alkoxyl group; and n represents an integer of from 1 to 100;

and wherein the reactive surfactant has a structure of $R^1$-$R^2$; wherein $R^1$ is an alkenyl group selected from $CH_3$—CH=CH—, $CH_2$=CH—HC—, $CH_2$=C($CH_3$)—$CH_2$—$CH_2$—; $R^2$ is a radical comprising at least two carbon atoms and at least one oxylene, oxypropylene or oxybutylene unit.

7. The wood coating composition according to claim 6 wherein the (meth)acrylate $C_6$-$C_{22}$ alkyl ester nonionic monomer is selected from 2-ethylhexyl (meth)acrylate, decyl (meth)acrylate, lauryl (meth)acrylate, isodecyl (meth)acrylate, and the combination thereof.

8. The wood coating composition according to claim 7 wherein the (meth)acrylate $C_6$-$C_{22}$ alkyl ester nonionic monomer is selected from 2-ethylhexyl (meth)acrylate, lauryl (meth)acrylate, and the combination thereof.

9. The wood coating composition according to claim 6 wherein the self-crosslinking monomer is selected from diacetone acrylamide, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth) acrylate, and the composition thereof.

10. The wood coating composition according to claim 6 wherein the reactive surfactant has a structure of $R^1$-$R^2$; wherein $R^2$ is —$C_6H_3(R^3)$—O—($CH_2$—$CH_2$—O)$_n$—$R_4$, —O—$CH_2$—CH($CH_2$—O—$C_6H_4$—$R^3$)—O—($CH_2$—$CH_2$—O)$_n$—$R_4$, —O—($CH_2$—$CH_2$—O)$_n$—$R^4$, —O—($CH_2$—CH($CH_3$)—O)$_n$—$R^4$, —O—($CH_2$—CH($CH_2CH_3$)—O)$_n$—$R^4$, —O—($CH_2$—$CH_2$—O)$_m$—($CH_2$—CH($CH_3$)—O)$_n$—$R^4$, —O—($CH_2$—CH($CH_3$)—O)$_m$—($CH_2$—$CH_2$—O)$_n$—$R^4$, —O—($CH_2$—CH($CH_2CH_3$)—O)$_m$—($CH_2$—$CH_2$—O)$_n$—$R^4$, or —O—($CH_2$—$CH_2$—O)$_m$—($CH_2$—CH($CH_2CH_3$)—O)$_n$—$R^4$; wherein $R^3$ is an alkyl group; $R^4$ is hydrogen or a polar group; n is from 5 to 100; and m is from 0 to 100.

* * * * *